United States Patent [19]

Berghoff

[11] 4,049,607

[45] Sept. 20, 1977

[54] HEAT CONVERTIBLE COATING COMPOSITIONS

[75] Inventor: Wellington Franklyn Berghoff, Madison, Conn.

[73] Assignee: ISIS Chemicals, Inc., Stamford, Conn.

[21] Appl. No.: 281,626

[22] Filed: Aug. 18, 1972

[51] Int. Cl.$^2$ .............................................. C08L 61/20
[52] U.S. Cl. .................... 260/29.4 UA; 260/29.6 TA; 260/29.6 MN; 260/33.2 R; 260/33.4 R; 260/39 P; 260/42.21; 260/851; 260/856
[58] Field of Search .............. 260/29.4 UA, 29.6 TA, 260/29.6 MN, 851, 856, 33.2 R, 33.4 R, 39 P, 42.21

[56] References Cited

U.S. PATENT DOCUMENTS

| | | | |
|---|---|---|---|
| 2,918,391 | 12/1959 | Hornibrook | 260/29.4 UA |
| 3,107,227 | 10/1963 | Suen et al. | 260/29.4 UA |
| 3,245,932 | 4/1966 | Glavis et al. | 260/29.4 UA |
| 3,300,428 | 1/1967 | Schmidt | 260/29.4 UA |
| 3,492,252 | 1/1970 | Euchner et al. | 260/29.4 UA |
| 3,705,124 | 12/1972 | Selby et al. | 260/29.6 TA |

*Primary Examiner*—Lorenzo B. Hayes

[57] ABSTRACT

A heat-convertible water-soluble coating compostion comprising a partially neutralized tertiary alkanol amine salt of a film-forming addition copolymer of a $C_2$-$C_8$ alkyl acrylate and about 8–15% of acrylic acid which may contain up to 5% of acrylamide. Neutralization is carried out in a small amount of water-miscible organic solvent selected from the group consisting of cellosolve acetate, butyl cellosolve, butanol and mixtures of these. The partially neutralized salt is adapted to cross-link with aminoplast when coated from water medium on a heat resistant substrate at 275°–350° F. The reactive cross-linking aminoplast is also water-soluble and is selected from the group consisting of melamine formaldehyde resin, urea-formaldehyde resin, guanidine formaldehyde resin and the alcohol-modified derivatives of the foregoing aminoplasts. The partially neutralized salt provides the tertiary alkanolamine at a preferred level of 61–65%. In a preferred polymer embodiment, the acid number of the copolymer lies between about 95 to about 125 and the copolymer which is dissolved in the special solvent is simply diluted with water so as to be useful per se as a primer coating for wood, metal, paper, etc., and specially useful with the heat reactive aminoplast as a metal enamel. Enamel coatings have outstanding shelf stability, total solubility in water, outstanding gloss, and superior hardness, excellent impact resistance, good adhesion and excellent bend resistance when compared to a standard alkyl-melamine coating which is applied from conventional organic solvents.

7 Claims, No Drawings

HEAT CONVERTIBLE COATING COMPOSITIONS

FIELD OF THE INVENTION

Heat-convertible industrial finishes used for production purposes are under criticism from various government agencies because of the amount of pollution they contribute from the application to the atmosphere. Virtually all major production finishing operations employ volatile solvent components, and these constitute from 30-95% of most coating formulations. The volatile solvent phase traditionally has been vented to the atmosphere and only now has federal legislation demanded that manufacturers limit these exhausts.

Solvent recovery and incineration equipment offer costly and only partial solutions to the air pollution problem. Powdered coatings and electrocoating constitute two so-called "solventless" systems which offer possible solutions but these also represent a substantial capital investment. Unfortunately, conversion to any one of the above techniques does not in many cases, result in a high quality product that will perform satisfactorily and particularly in the field of heat-convertible coatings.

The invention present enables the user of industrial heat-convertible coatings to utilize virtually all of his composition in the application and curing equipment without any major changes in his process, but yet solves the ecology problem.

The invention specifically provides a water based and water reducible industrial baking finish which is heat-convertible and non-polluting. Because of the special ingredients and conditions of the aqueous solution, a coating of superior physical properties and performance is unexpectedly achieved, in a field where the prior art did not provide such improved coatings.

The invention provides water-dilutable concentrates of film forming compositions not only suitable as baking enamel coatings for metals, but also as heat-convertible coatings for vacuum-metallized plastics, heat resistant masonite, wood, heat resistant paper and the like.

Colloidal suspensions of acrylic polymers or copolymers in water as well as water-dilutable, aminoplast-linked coatings are each separately well-known but these, when diluted with water and applied as a baking enamel, by admixture of a aminoplast cross-linking agent provide coatings of only moderate quality, generally inferior to coatings laid down from solvent, e.g., the conventional alkyd-melamine enamel.

DESCRIPTION OF THE PRIOR ART

It is known to prepare water-soluble industrial baking enamels by the use of esterified acrylic copolymers which may contain substantial amounts of unesterified acrylic acid of methacrylic acid in the copolymer. It is also known that the copolymer may have admixed therewith an acrylamide.

In Glavis et al U.S. Pat. No. 3,245,932, there are disclosed water-soluble 2-dimethylamino-ethanol salts of addition copolymers derived from copolymers of certain methacrylic acid esters with 1-4% of methacrylic acid (by weight).

The methacrylate ester copolymer in Glavis et al patent is completely neutralized with the minimal amount of 2-dimethylaminoethanol in order to achieve water solubility by reaction with the methacrylate acid contained in the copolymer blend, e.g., with from 1-4% as methacrylate acid, and preferably 2-4%. The water-soluble enamels based on such copolymers were prepared for blending with aminoplast by the incorporation of suitable amounts of aminoplast with butanol or alcohol type solvents and with pigments. The methacrylate enamels thus prepared are generally quite viscous and subject to settling in the concentrate and to more rapid settling when diluted with water to use-concentrations unless the maximum acid number of the polymer is below about 40. This severe disadvantage is further complicated by the relatively poor physical properties of the baked enamels particularly low degree of flexibility.

The precise teaching of copolymer acidity in Glavis et al U.S. Pat. No. 3,245,932 is set forth in Column 1, lines 53-55 where it is pointed out that only when the acid groups in the copolymer are reduced to 1-4% by weight of the copolymer is the water sensitivity of the coating overcome. The acid number of the copolymer at Column 1, lines 40-53 at 1-4% acid is below 40, in contrast to the acid number of the present polymer which is at least 95 and up to 125.

At an acid number of the present acrylic acid-alkylacrylate copolymers which is greater than 125 and with partial neutralization between 50-75% by the tertiary alkanolamine, the acrylate acid salt of the tertiary alkanolamine becomes very viscous and water sensitive. Uniform non-settling coatings in water cannot be provided and as a result it is difficult to provide uniform and reproducible coatings by conventional coating methods, e.g., dip or immersion-coating, spray-coating, roller-coating, kiss-coating or the like. Further, films such as alkanolamine salts are water sensitive even after curing at elevated temperatures.

If neutralization is less than 55% of stoichiometry, the salt settles out, and coatings have very poor (low) gloss. If neutralization is about 75%, the liquid composition becomes very sticky, settles out and is difficult, if not impossible, to disperse in water to make a stable water-based coating composition.

If the acid number of the copolymer is less than 95 and partial neutralization is carried out in the 55-75% range based on stoichiometry, a water solution of the copolymer is not achieved and as a result, colloidal aggregates which are non-uniform and non-reproducible are formed to provide unsatisfactory coating compositions.

Only in the narrow range of 55-75% preferably 61-65% neutralization with special tertiary alkanolamine do the acrylate ester-acrylic acid copolymers of the present invention provide stable, high solids, water soluble coatings which cure rapidly and efficiently at 275°-350° F.

It was surprising to discover that the partial neutralization of the acrylic copolymer of alkyl acrylate containing from $C_2-C_8$ carbon atoms in the alkyl chain with 8-15% acrylic acid in an amount more than twice that in Glavis et al's polymer and the present polymer can be dissolved in a minimal amount of water-miscible solvent, and that only 55-75% of the acid based upon acid number is neutralized to achieve complete water solubility. The partial neutralization preferably takes place with tertiary alkanolamine in the presence of minimal amounts of organic solvent which is water-miscible to provide a high solids liquid which can be diluted with water, which is the simplest non-persistent and non-polluting coating material.

The advantage of water-miscible alcohol, ester or alcohol-ester solvent such as cellosolve acetate, butyl cellosolve or butanol lies in the minimal quantities required in the freedom of fire hazard and danger to health and to the wide acceptability of these solvents available at relatively low cost.

Also these solvents are adapted for stabilizing the coating which is obtained by mixing with aminoplast and heating-conversion with the alcohol soluble aminoplast such as melamine formaldehyde, guanidine formaldehyde, urea formaldehyde and the like. Heat convertible coatings are produced by the aqueous compositions which are indeed superior to the conventional solvent based baking enamel in respect to high gloss, film flexibility, adhesion characteristics, and more resistance, all of which properties are essential to high performance in the field.

It is an object of the invention to provide a stable non-flammable high performance water-based coating having superior properties of gloss, shelf stability, hardness, adhesion, chemical resistance, color retention, impact resistance and bend resistance in comparison with other water-based coatings which are available in commerce.

It is a further object of the invention to provide water-dilutable film-forming acrylic copolymer salt compositions which are partially neutralized at 55-75%, preferably 61-65% stoichiometric rates and are useful per se as a primer coating for heat resistance metal, wood, paper, plastic or other substrates and in which the acrylic copolymer has an acid number, based upon its acrylic acid content, of at least about 95 up to 125 so that it is insoluble in water in the acid form, but is water soluble when neutralized with a tertiary alkanolamine to an extent preferably between 60% and 65%.

It is a further object to provide water-soluble enamels comprised of a copolymer of an esterified acrylic acid and an unesterified acrylic acid in an amount of 8-15% which may contain acrylamide up to 5% or hydroxyethyl acrylate in an amount of about 5-10%.

It is a further object of the present invention to provide water-dilutable, aminoplast-linked, aqueous, copolymer salt compositions in which a substantial degree of neutralization of free carboxylic acid groups, based on the acrylate acid, has been achieved, and in which the specifically 55-75% by stoichiometry esterified carboxylic acid groups are not extensively hydrolyzed when the composition is neutralized or diluted.

It is a further object of the present invention to provide improved compositions of acrylic copolymers which are soluble in water, can be diluted with water in any quantities without settling, and which provide baking enamels of superior qualities of adhesion, gloss, hardness, impact and mar resistance and flexibility.

Other objects and advantages of the present invention will be apparent from the further description and examples of the invention.

SUMMARY OF THE INVENTION

This invention relates to heat-convertible water soluble compositions comprising a film-forming copolymer of $C_2$-$C_8$ alkyl acrylate and from 8-15% of acrylic acid which may be a dipolymer, a terpolymer or a tetrapolymer, the third monomer being from about 0.5 to about 5% of acrylamide and the fourth monomer being from about 5% to 10% of hydroxyethyl acrylate and which is partially neutralized with a tertiary alkanolamine at 55-75%, preferably 61-65% based on the acid number of the polymer which in a preferred embodiment lies in a range between about 95 and about 120.

The partially neutralized tertiary alkanol amine salt is formed in the presence of a minimal amount of medium-boiling, water-miscible, volatile organic solvent which is an alcohol, ester or alcohol ester such as cellosolve acetate, butanol, butyl cellosolve or mixtures of these. A water dilutable and water soluble acrylic coating is provided by this partial neutralization which is useful per se as a primer coating for glass, wood, metal, paper or plastic surfaces, and is especially useful in a preferred embodiment as the essential ingredient with a heat-reactive, water-dispersible alcohol-soluble aminoplast such as melamine-formaldehyde resin, urea-formaldehyde resin, guanidine formaldehyde resin, and various alcohol-modified aminoplasts derived from these aforesaid formaldehyde condensation resins.

DESCRIPTION OF THE PREFERRED EMBODIMENTS

A. COMMERCIAL AVAILABILITY OF THERMOSETTING WATER-INSOLUBLE ACRYLATE RESINS OF ACID NUMBER 95-125

1. A clear heat-convertible thermosetting acrylate resin which is available commercially under the designation with acid number lying between 95 and 115, and is supplied by the manufacturer, American Cyanamid Company in the form of a solution in cellosolve, butanol or butyl cellosolve. Based upon manufacturer's conformation and infrared analysis, this resin is believed to be a film-forming copolymer of 70-75% amyl, hexyl or ethylhexyl acrylate of about 5% acrylamide and from 8-15% of acrylic acid, the polymer having a molecular weight in the range of about 20,000 to 200,000 as determined by the viscosity method and the chain length of this polymer having been regulated with a chain-regulator, e.g., a mercaptan or the like as is known in the art.

2. The same type of copolymer is also available under the designation XC-4011 which is an example of alkylacrylate of the same ester species with 8-15% of acrylic acid, but no acrylamide is present.

LABORATORY PREPARATION OF THERMOSETTING POLYMERS

3. Other heat-convertible thermosetting acrylate copolymer resins of acid number of 95-120 may be prepared by known addition polymerization methods using free radical initiators in water-miscible organic solvent wherein the solvent is directly useful in the aminoplast system and is preferred to be a medium boiling liquid such as cellosolve, cellosolve acetate, butyl cellosolve, butanol or mixtures and wherein the alkyl acrylate may be ethyl acrylate, propyl acrylate, butylacrylate, amy acrylate, 2-ethylhexyl acrylate, hexyl acrylate or branched chain isomers of these acrylates. The weight proportion of alkyl acrylate is preferably 85-92% while the proportion of acrylic acid is 8-15% and from 0-5% acrylamide may be added to match the prepared commercial polymer. Other copolymers include modifications of the polymers 1, 2 and 3 above, in which from about 5-10% of the polymer is hydroxyethyl acrylate or hydroxy propylacrylate. However, the XC-4011 copolymer is most preferred and this polymer contain from 1-5% acrylamide, from 8-15% of acrylic acid and from 85-92% of C-5 acrylate, e.g., of amyl acrylate with a molecular weight lying in the range of 20,000 to 200,000.

B. PARTIAL NEUTRALIZATION OF THE WATER-INSOLUBLE ACRYLATE-ACRYLIC ACID RESIN OF ACID NUMBER 95-125

An illustrative method of partial neutralization is applied to commercial resins XC-4010 and XC-4011 which are identified in paragraph A above. The relatively non-toxic 2 dimethyl amino ethanol, is used as an example of a tertiary amino alkanol which is added to a cellosolve solution of XC-4010 or XC-4011 at 50% resin solids. The neutralization with the amine is monitored by means of pH change and also by the use of an Infrared Spectrometer which permits observation of the disappearance of the 5.83 micron band in the infrared region which takes place on the average between 61–65% neutralization depending upon the acid number of the starting resin in the range of about 105–115.

At the 61–65% stage of partial acid neutralization, the salt is completely water-soluble and the mix is quite fluid. The 61–65% salt in cellosolve is now ready for milling, pigmentation and formulation with the aminoplast cross-linkers.

This illustrative procedure applies equally well to laboratory polymers which are based upon added (5–10%) hydroxyethyl acrylate or hydroxyproplyacrylate.

The following example illustrates the formulation of a primer coating for heat resistant masonite.

EXAMPLE I

The primer coating is formulated by mixing pigment such as titanium dioxide with the acrylate ester-acrylic acid copolymer identified in paragraph A, the preferred formulation of this example containing XC-4010 resin in cellosolve at 50% resin solids. A small amount of the resin (XC-4010) is mixed with the pigment to grind the pigment to the proper dispersion but to this resin there is added 60–65% of the stoichiometric amount of dimethyl amino ethanol based upon the acid number of the resin. After grinding in the minimum amount of resin in cellosolve in this manner, there is added more resin at 50% solids and more amine with small amounts of cellosolve to provide a mixture of 36–40 parts of resin, about 3 parts of amine (hereinafter called DMAE) and the remainder cellosolve solvent, the total pigment level being at 3–5% TiO$_2$.

To provide a primer coating adapted for spraying, 4 parts of cellosolve solution is diluted with efficient stirring with 5 parts of water and the mixture can be used directly for spraying or may be further diluted with water at 4 parts water mixture to 1 part of additional water. Cross spraying of a masonite wall board panel provides a uniform 1½ ml thickness coating which is tightly adherent to the base and has outstanding properties as a primer.

Although the foregoing example shows formulation in cellosolve at about 50% resin solids, resin samples have been neutralized at 75% solids with excellent results and have been pigmented, as for example, with titanium dioxide, or have been neutralized at 60–65% stoichiometric to provide clear coatings having outstanding properties as a primer. The primer coating is cured at a baking temperature of 300°–350° F. for 10 to 30 minutes. Higher temperatures may be used if heat resistant substrates are finished with the primer.

The primer is strongly adherent to other coatings such as urethane coating, polyamide coatings, vinyl resin cellulose ester resin coatings and the like, and may also be used to coat plastic sheet material having appropriate flame-resistant additives incorporated therein.

EXAMPLE II

This example illustrates the formulation of a preferred white baking enamel based upon the mixture of a preferred aminoplast and resin under the designation XC-4010. The inventor identifies this enamel as Hycol Baking Enamel I-Sis X-66 and the formula is given below.

| No. | Ingredient | % |
|---|---|---|
| 1 | Pigment (TiO$_2$) | 28.86 |
| 2 | Resin (XC-4010) for grinding with pigment | 10.15 |
| 3 | Solvent (Cellosolve) | 6.51 |
| 4 | Defoamer (Nilfoam #7) | 0.10 |
| 5 | Resin (XC-4010) - balance | 13.50 |
| 6 | Aminoplast Uformite MM 83 | 7.18 |
| 7 | Slip Aid - SL-140 | 0.46 |
| 8 | Water | 34.47 |
| 9 | Tertiary alkanolamine (DMAE) | 1.77 |

To prepare the pigment components 1, 2, 3 and 4 are ground in the conventional grinding equipment for enamel formulation and thereafter components 5, 6, 7 and 8 are added and the amine is mixed slowly, under stirring to prepare the liquid paste at a 35% water dilution in the form of the salt.

The aminoplast UFORMITE MM-83 is a registered trademark of methoxy methyl melamine resin from Rohm and Haas company which is a polymer known for crosslinking both solvent and water-based polyols such as alkyds, epoxies, oil-free polyesters, and thermosetting acrylic resins. Uformite MM-83 provides fast uncatalyzed cure and efficiency, high gloss, resistance to embrittlement on overbake or aging, and excellent chemical resistance.

SL-140 is a polymeric wax which is dispersed in glycol and H$_2$O and the addition of SL-140 improves mar and scuff resistance. It can be omitted if desired, but it improves hardness from a pencil hardness of 2H to a 4H when baked at 335° F for 10 minutes.

Nilfoam 7-Defoamer is a commercial defoamer product added to the system to eliminate bubbling, which is inherent in aqueous systems and grinding results are improved if this product is added to the pigment grind. The defoamer cannot be added to the product material after grinding, since it has a tendency to pock.

The following data shows the characteristics of the formulation.

| Product: | Hycol Baking Enamel |
|---|---|
| Code: | I-Sis X-66 LB 3090 Baking Enamel |
| Color: | White |
| Gloss: | 98+ at 1.0 mils |
| Viscosity: | 1000 CPS (Brookfield) |
| Wt/Gal: | 10.0 lbs. |
| % Non Volatile: | 50.0 |
| Hiding: | 600-700 sq. ft. |
| Application: | Spray or Dip |
| Reduction: | 40–45 seconds, 4 Ford Cup with water |
| Air Flash: | 8–10 minutes |
| Bake: | 15 at 325, 20 at 300° F |
| Remarks: | I-Sis X-66 LB 3090 Baking Enamel exhibits high gloss, excellent color retention, adhesion, bend and impact resistance, and coil coatings will cure at 600° F for 50 seconds and I-Sis X-66 will cure but proper flashoff must be provided. |

The following data shows comparison with an alkyd melamine baking enamel in an organic solvent.

| Film Properties | I-Sis X-55 LB 3090 | Organic Solvent Soluble alkyd, melamine enamel |
|---|---|---|
| Film Thickness | 0.9 | 0.9 |
| Gloss, 60° | 96 | 86 |
| Hardness (Pencil) | 2H-3H | H-2H |
| Impact Resistance, in lb. | | |
| Front | 56 | 36 |
| Reverse | 16 | 2 |
| Adhesion (cross-hatch) | 100 | 100 |
| Mandrel | 1/8" | F |
| Solvent Resistance, MEK Rub | 200+ | 200+ |
| Salt Spray 250 hrs. | 9F | 9M |
| Rusting | 7/2 | 9/2 |

Blistering Rated by ASTMD-714, 10=none; 8 - smallest; 6 - larger. Frequency, F = few, M = medium distribution.
Rusting, Rated by PSTMD-610-43 first number is intensity, second number, 2" with blistering.

The above white formulation contains the following ingredients:

| I. Solid Phase | | 30-55% |
|---|---|---|
| | a) Binder | 50-100% |
| | 1) Acrylic acid resin. | 60-95% |
| | 2) Melamine resin | 5-40% |
| | b) Titanium Dioxide Pigment | 0-50% |
| II. Volatile Phase | | 45-70% |
| | 1) Cellosolve Solvent (Ethylene Glycol monoethylether) | 5-20% |
| | 2) Water | 80-95 % |
| | 3) Amine base for reaction with acrylic acid resin (Dimethylaminoethanol, preferred amine) | |

In comparison with the conventional alkyd-melamine formaldehyde organic solvent formula, the I-Sis X-66 LB 3090 enamels of the present examples uses substantially no organic solvent other than that in which the resin is supplied by the manufacturer and because the system is in essence a water soluble system provides no injury to the environment, reducing the fire hazard associated with volatile organic solvent and provides superior properties over the conventional alkyd-melamine finish as follows:

1. harder finish
2. better flexibility
3. higher resistance to impact
4. better adhesion to metal
5. better chemical resistance
6. better resistance to stains
7. elimination of toxic fume or inhalation hazard by the manufacturer and by the user
8. excellent gloss with ability to control gloss by use of flatting pigments (silica gel types)

EXAMPLE III

FORMULATION OF NON-WHITE BAKING ENAMELS

The following illustrate pigmentation recipes in non-white primary colors:

| RECIPE FOR RED AND YELLOW ENAMEL | | | |
|---|---|---|---|
| Red | | Yellow | |
| 1. Cadmium Red | 11.21% | 1. Ferrite Yellow | 11.21% |
| 2. XC-4010 | 13.79% | 2. Same As Red | |
| 3. Cellosolve | 7.79% | 3. Same as Red | |
| 4. Nilfoam #7 | .10% | 4. Same as Red | |
| 5. XC-4101 | 12.33% | 5. Same as Red | |
| 6. MM 83 | 6.72% | 6. Same as Red | |
| 7. DMAE | 1.93% | 7. Same as Red | |
| 8. SL-140 | | 8. Same as Red | |
| 9. Water | .53% | 8. Same as Red | |
| 9. Water | 45-60% | 9. Same as Red | |

Both Red and Yellow:
Mix items 1, 2, 3, 4; grind; remove from grinding media; add items 5, 6, 7, 8; mix; add item 9 slowly.

| RECIPE FOR BLUE AND GREEN ENAMELS | | | |
|---|---|---|---|
| Blue | | Green | |
| 1. TiO₂ | 3.13% | 1. Same as Blue | |
| *2. Phthalo Blue | 1.30% | *2. Phthalo Green | |
| 3. XC-4010 | 4.88% | 3. Same as Blue | |
| 4. Cellosolve | 1.33% | 4. Same as Blue | |
| 5. Nilfoam #7 | .10% | 5. Same as Blue | |
| 6. XC-4010 | 31.60% | 6. Same as Blue | |
| 7. MM-83 | 7.43% | 7. Same as Blue | |
| 8. DMAE | 2.67% | 8. Same as Blue | |
| 9. SL-140 | .64% | 9. Same as Blue | |
| 10. Water | 46.91% | 10. Same as Blue | |

Mix items 1,2,3,4,5; grind; remove from grinding media; add items 6,7,8,9; mix; add item 10 slowly.

| RECIPE FOR BLACK ENAMEL | |
|---|---|
| 1. Carbon Black | 3.4% |
| 2. XC-4010 | 13.90% |
| 3. Cellosolve | 5.67% |
| 4. Milfoam #7 | .10% |
| 5. XC-4010 | 14.83% |
| 6. MM-83 | 8.69% |
| 7. DMAE | 1.93% |
| 8. SL-140 | .27% |
| 9. Water | 51.07 |

Mix items 1,2,3,4; grind; remove from grinding media; add items 5,6,7,8; mix; add item 9 slowly.

*phthalo cyanine blue and green

ALCOHOL SOLUBLE AMINOPLASTS OTHER THAN UFORMITE MM-83

Other alcohol soluble aminoplasts which may be used in place of MM-83 are the alcohol soluble and water soluble film-forming condensation products of urea-formaldehyde and guanidine-formaldehyde which include the alcohol modified condensates based upon methanol and ethanol. These alcohol and water soluble modifications include various ratios of alkoxyalkyl groups in the urea-, guanidine- or melamine-formaldehyde condensates, e.g., the ratio of methoxylated or ethoxylated groups to methylol groups may vary widely as is required to impart both water and alcohol solubility. For example, in the melamine series, the ratio of methoxymethyl groups to melamine may be 2:1 with the methylol groups to melamine being 1:1, 2:1 or 3:1 or intermediate values between these ratios may be used. These ratios are sometimes termed monomethoxy, dimethoxy and trimethoxy methylol melamine, respectively.

In the foregoing examples, the preferred methylol melamines have methoxymethyl groups between 1:1 and 2:1 and the same preferred ratios are desired for the urea formaldehyde condensates and the guanidine formaldehyde condensates.

It is believed that a new and unique chemical as well as physical reaction occurs between the partial tertiary amino alkanol salt of the acrylate ester-acrylic acid copolymer at 55-75% of stoichiometry and the aminoplast which leads to a unique combination of improved properties of gloss, flexibility, adhesion, hardness and toughness (mar-resistance) which is achieved very quickly in the absence of curing catalysts at relatively moderate curing temperatures. The gumminess characteristic of ammonio neutralized acrylic acid polymer is completely eliminated. The water-sensitivity of film-forming primary amine salts is not found in the present invention. A characteristic and totally unexpected gloss increase by addition of melamine resin is achieved with methacrylate estermethacrylic acid polymers and both intercoat adhesion and flexibilization properties are enhanced to a degree completely impossible to achieve with the methacrylate polymer acid salts regardless of the type of amine used.

Whereas lubricating waxes and plasticizers are essential to provide adequate film properties with other acrylic acid or methacrylic acid polymers, (see Fine III U.S. Pat. No. 2,702,796, for example) the present invention does not require these wax additives and even under the most extreme circumstances where the customer requires the slip or wax feeling or touch, only from 0.1 to 0.5% of wax is needed, these being the paraffin type or natural waxes such as carnauba, beeswax of the like.

Although preferred formulations given above are for coating metals, plastics, hardboard and fabrics under strong conditions, it is obvious that the present aqueous compositions may be used to impregnate paper, leather, wood, concrete, ceramic and knitted, woven or non-woven fabrics and in the pigment printing and dyeing of such fabrics. Upon curing at the specified elevated temperatures, water-resistant and completely cured coatings or impregnated products are achieved.

Although the preferred tertiary alkanol amine herein is the readily available DMAE, e.g., dimethylamino ethanol, other tertiary alkanol amines may be used with good results and examples are triethanolamine, dimethyl aminopropanol, tripropanol amine, methyl ethyl amino propanol, diethylamino propanol, diethylamino ethanol, and adjacent alkyl homologues of these tertiary alkanol amines. These preferred amines are retained in the cured film in critical amounts employed for 55-75% (preferred 61-65%) of stoichiometry based upon polymeric acrylate-acrylic carboxylic acid group and each exercises a unique interaction with aminoplast in promoting maximum gloss, good flow, improved penetration of chalky surfaces and outstanding adhesion. This interaction occurs best with the alcohol soluble, water soluble melamine formaldehyde species of aminoplast.

Having thus disclosed the invention, what is claimed is:

1. A heat convertible coating composition consisting essentially of water and, as the essential film-forming polymer ingredient in solution in said water, a partially neutralized water soluble tertiary alkanol amine salt of a copolymer, dissolved in a sufficient amount of solvent, to dissolve said salt, said alkanol amine being selected from the group consisting of dimethyl amino ethanol, triethanolamine, dimethyl aminopropanol, tripropanol amine and diethylamino ethanol, said copolymer consisting of $C_2$-$C_8$ alkyl acrylate and 8 - 15% acrylic acid with from 0 - 5% acrylamide and 5 - 10% of hydroxyethyl acrylate or hydroxypropyl acrylate and having a molecular weight of 20,000 to 200,000 and an acid number of 95 - 120, said partially neutralized tertiary alkanol amine salt having from 61 - 65% of the stoichiometric amount of tertiary alkanol amine required for complete neutralization of all of the carboxyl groups of said copolymer, said solvent for said 61 - 65% neutralized copolymer salt solution selected from the group consisting of ethylene glycol monoethyl ether, ethylene glycol monoethyl ether acetate, ethylene glycol monobutyl ether butanol and mixtures of these, and a cross-linking, water-soluble and alcohol-soluble film-forming aminoplast selected from the group consisting of melamine-formaldehyde resin condensate, urea-formaldehyde resin condensate, guamidine-formaldehyde resin condensate and the methanol and ethanol modified forms of the aforesaid condensates, and wherein all but the alcohol or ester solvent in the volatile phase is water.

2. A heat-convertible coating composition as claimed in claim 1, wherein said partially neutralized water-soluble tertiary alkanol amine salt of said copolymer is the dimethylamino ethanol salt of the copolymer.

3. A heat convertible coating composition as claimed in claim 1 wherein said partially neutralized water-soluble tertiary alkanol amine salt of said copolymer is the dimethylamino ethanol salt of the copolymer of 8-15% acrylic acid, 5% acrylamide and the remainder is $C_2$-$C_8$ acrylate ester.

4. A heat convertible coating composition as claimed in claim 1 wherein said partially neutralized water-soluble tertiary alkanol amine salt of said copolymer is the dimethylamino ethanol salt of the copolymer of 8-15% acrylic acid, 5-10% hydroxyethylacrylate, 5% acrylamide and the remainder is $C_2$-$C_8$ alkyl acrylate.

5. A heat convertible composition as claimed in claim 1, wherein said aminoplast is an alcohol modified melamine formaldehyde condensate and wherein the alcohol is methanol.

6. A heat convertible composition as claimed in claim 1, wherein the solvent for neutralization is ethylene glycol monoethyl ether in a proportion of about 5 to 20% of the aqueous composition; the aminoplast cross-linker is present in an amount of from about 5 to about 30% of the total film-forming binder of the composition; the partially neutralized salt of the copolymer is from 70-95% of the total film-forming binder of the composition; and wherein all but the cellosolve in the volatile phase of the composition is water.

7. A heat convertible composition as claimed in claim 6, wherein a pigment is included in an amount of from about 2 to about 50% of the total solid phase of the composition.

* * * * *